June 2, 1936.    L. HOLTSCHNEIDER    2,042,847
DIVIDING HEAD FOR LATHES
Filed Dec. 27, 1933    2 Sheets-Sheet 2
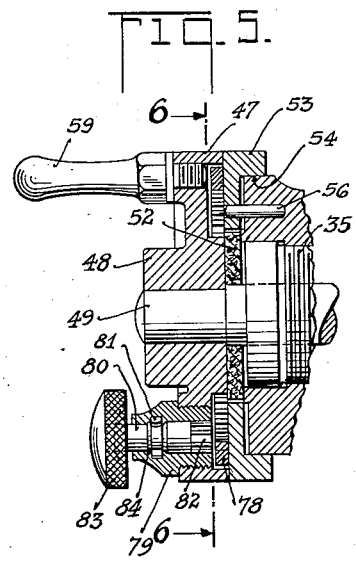
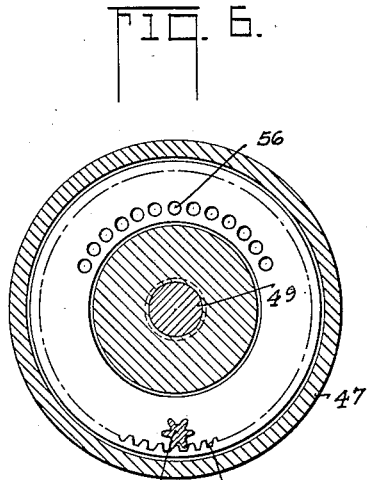
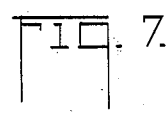
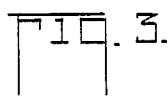
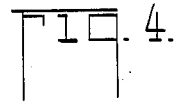
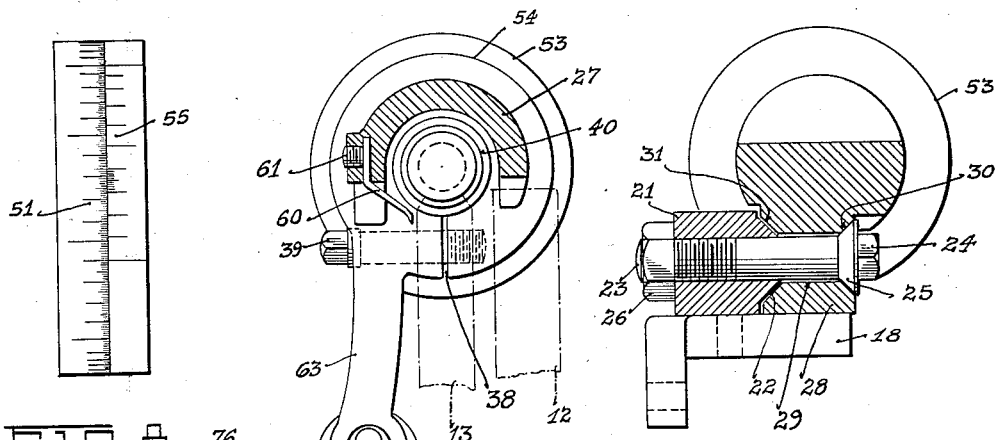
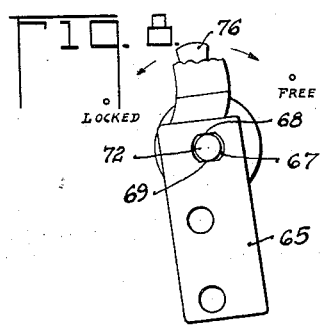
INVENTOR
LEO HOLTSCHNEIDER
BY
Van Deventer & Grier
ATTORNEYS.

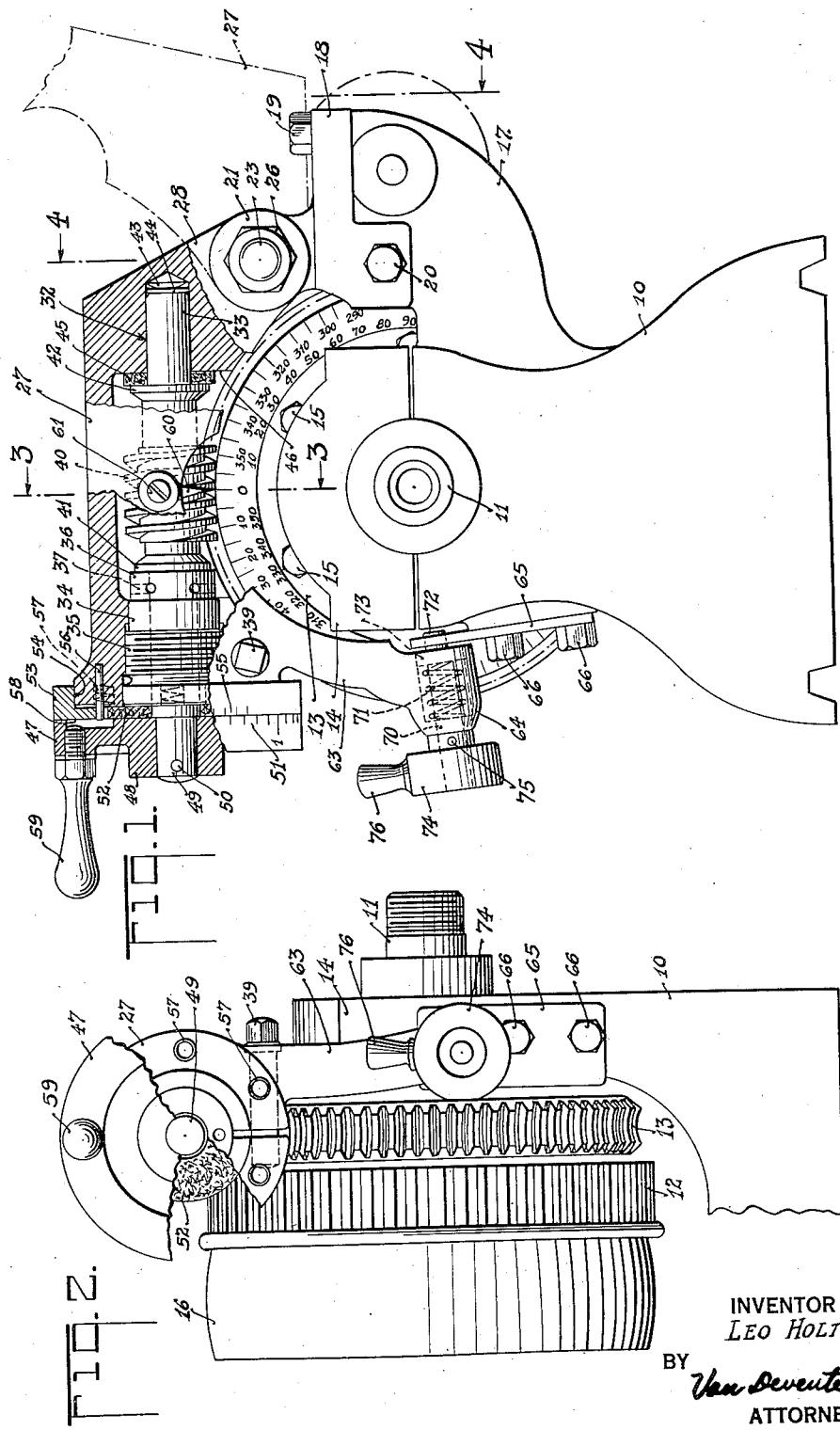

Patented June 2, 1936

2,042,847

UNITED STATES PATENT OFFICE 2,042,847

DIVIDING HEAD FOR LATHES

Leo Holtschneider, Phoenix, Ariz.

Application December 27, 1933, Serial No. 704,084

10 Claims. (Cl. 90—56)

This invention relates to improvements in dividing heads for lathes and has for an object the provision of mechanism by means of which accurate angular rotation or adjustment of the lathe spindle may be effected.

A further object of the invention is the provision of an accurate worm gear on the lathe spindle preferably adjacent to the gear at the large end of the cone pulley.

Still another object of the invention is the provision of a swingable arm carrying a worm, a visual indicator for rotating the worm, and a suitable locking device for holding the worm into the proper engagement with the worm gear, whereby the locking device may be disengaged and the arm may be swung back out of the zone of the spindle, making the entire headstock of the lathe accessible from all points.

Heretofore some devices of this character have been provided with worms engaging the back gears, but the accuracy of such devices is limited because the back gears are spur gears and are not intended to cooperate with a worm. Other existing devices of this character are attached through the medium of a face plate or a chuck but they have disadvantages in the loss of the time required to set them up, and the nature of the structures is less conducive to accuracy than the present invention which is built in and forms an integral part of the lathe itself.

Other objects and advantages of this invention will become obvious to those skilled in the art upon a perusal of this specification and the appended claims.

Referring to the drawings:

Fig. 1 is an elevation partly in section of a preferred embodiment of the invention positioned on the head stock of a lathe;

Fig. 2 is an elevation partly in section of the device as viewed in a plane at right angles to the plane of elevation shown in Fig. 1;

Fig. 3 is a view of the device partly in section along the line 3—3 of Fig. 1;

Fig. 4 is a cross sectional view of the pivoted support as viewed along the line 4—4 of Fig. 1;

Fig. 5 is an elevation partly in section of a modifiaction of the hand wheel and vernier shown in Fig. 1;

Fig. 6 is a sectional view taken along the line 6—6 of Fig. 5;

Fig. 7 is a view of the hand wheel showing a double vernier arrangement; and

Fig. 8 is an elevation of the locking plate showing its relation to the eccentric plunger.

Referring to Figs. 1 and 2, the head stock 10 of the lathe has its spindle 11 provided with a large gear 12. This gear is suitably keyed or otherwise fixed to the spindle 11.

A worm gear 13 is provided between the gear 12 and the end bearing 14 and may be secured to the gear 12 by means of bolts 15, or any other suitable means. A clearance slot (not shown) is formed in the web of the worm gear 13 to enable the cone 16 to be released when it is necessary to reduce the speed of the spindle by means of the big gear, when the lathe is in ordinary use. This releasing means has no bearing on the present invention and is not herein shown in detail. The projecting arm 17 of the head stock 10 has secured thereto a bracket 18 by means of cap screws 19 and 20. This bracket has integral therewith a round boss 21, one end of which is tapered. This tapered end is designated by the numeral 22 and a hole through the center of the boss is provided for the bolt 23. The bolt 23 is provided with a head 24 having a tapered shoulder 25. The end of the bolt opposite the head 24 is threaded to accommodate the nut 26 and this nut may be one of the locking variety, or the bolt 23 may be lengthened (not shown) and provided with two nuts 26, so that any desired adjustment of the bolt may be secured and this adjustment may be retained by means of the lock nut. The hole in the boss 21 may have a portion of its length threaded to fit the threads on the bolt 23, in which case the desired adjustment may be obtained with the bolt 23 and this adjustment may then be retained by means of the nut 26 which would then serve as a locknut.

The main body 27 of the device houses the worm and worm shaft, as will presently be described. The rear extension 28 of the body member 27 is made in the form of a boss, and a hole 29 in said boss is larger than and clears the bolt 23. Beveled depressions 30 and 31 are formed in either face of the boss 28 and the beveled depression 30 is engaged by the face of the tapered shoulder 25, and the beveled depression 31 is engaged by the tapered end 22 of the boss 21. The nut 26 is adjusted so that the angular surfaces of 30 and 31 bear freely and without lost motion against the surfaces of 25 and 22.

The main body 27 is provided with a bearing 32 for one end of the shaft 33. Near the other end of the shaft 33 a sleeve 34 is positioned thereon and forms therewith a bearing. The sleeve 34 has a threaded portion 35 at one end thereof, and a step 36 at the other end thereof is provided with a plurality of spanner holes 37. The main body 27 is bored out and threaded to match the threads 35 on the sleeve 34, and a plain reamed hole members up with the midportion of the sleeve 34. The main body 27 is provided with a slot 38 and a locking bolt 39 is provided across the slot 38 and at right angles thereto for clamping the body against a portion of the sleeve 34 when a desired adjustment of the sleeve 34 is obtained. The shaft 33 is provided with a worm 40 which, when the device is positioned as shown in Fig. 1, engages the teeth of the worm gear 13. The shaft 33 is also provided with shoulders 41 and 42, and the shoulder 41 members up with the end 36 of the sleeve 34.

A hardened thrust member 43 is positioned at the bottom end of the hole forming the bearing 32, and a thrust washer 44 is positioned between the end of the shaft 33 and the thrust member 43.

With the clamping bolt 39 loosened, the sleeve 34 by means of a spanner wrench engaging the spanner holes 37 may be rotated in either direction and substantially all end play in the shaft 33 may be taken up by screwing the sleeve 34 toward the thrust member 43. A felt washer or any other suitable oil retainer 45 may be provided between the shoulder 42 and the inner face 46 of the interior of the body 27 adjacent to the bearing 32.

A disc or wheel 47 is provided with a hub 48 having a hole formed therein to fit the stepped end 49 of the shaft 33 and is secured there by means of a taper pin 50, or any other suitable means. The circumferential face of this wheel is provided with graduations designated by the numeral 51. A suitable felt washer or oil ring 52 is provided between the inner face of the hub 48 and the adjacent end of the sleeve 34. A stationary disc or ring 53, which might be termed a vernier ring, preferably of the same diameter as the wheel 47 is hollowed out to form a working fit upon the body member 27 along the surface indicated by the numeral 54. The circumferential face of this ring is also provided with graduations designated by the numeral 55, which cooperate with the graduations 51 above referred to. The ring 53 has a clearance hole for clearing the felt ring 52 and is supported on the body 27 by a dowel pin 56, which may engage any one of a plurality of dowel holes in the vernier ring 53. Another arrangement contemplates formation of a plurality of flutes on the vernier ring engaging like flutes formed on the body 27 whereby the vernier ring 53 may be adjusted to the best light position in the place where the lathe is set up.

A plurality of compression springs 57 pressing against the ring 53 are provided for keeping the face 58 of the ring 53 in contact with the wheel 47.

The wheel 47 is provided with a handle 59 by means of which it may be rotated, thereby rotating the shaft 33, together with the worm 40, and in turn the worm gear 13 is rotated.

The worm gear 13 has its outer face provided with graduations in degrees. It has been found preferable to indicate these degrees from "0" to "360", reading both to the right and to the left. The body 27 is provided with a pointer 60 secured by the screw 61. This pointer is bent in toward the worm gear 13 so that the movement of the gear 13 and incidentally the spindle 11 may be read in degrees, on the graduated face of the worm gear 13.

The main body 27 has an arm 63 extending downwardly and having its lower end formed into a boss 64.

A locking plate 65 is secured to the head stock 10 by means of cap screws 66. This locking plate is provided with a hole 67 having straight sides 68 and 69.

The boss 64 is drilled out and provided with a shoulder shaft 70 and a spring 71. The end 72 of the shaft 70 is eccentric to the center line of the main body of the shaft 70. This is clearly shown in Fig. 1. The shoulder 73 of the shaft 70 is engaged by the spring 71 and thereby the shaft 70 is held in its extreme position to the right, as viewed in Fig. 1. A knob 74 is secured to the shaft 70 by means of the taper pin 75 or any other suitable means. This knob is also provided with a handle 76.

The eccentric portion 72 of the shaft 70 engages the hole 67 in the plate 65 when the device is in operative relation with the worm gear 13. When a desired setting is obtained, the shaft 70 may be rotated angularly toward the right, as viewed in Fig. 2, to lock the lathe spindle to the desired position. This locking is effected as follows: the cam action of the end 72 of the shaft 70 working against the flat surface 68 of the hole 67 clamps the worm 40 into closer engagement with the worm gear 13, thereby retaining the spindle in this position until such time as the shaft 70 is angularly rotated counterclockwise, thereby establishing normal clearance between the worm 40 and the worm gear 13.

When it is desired to use the lathe for turning, etc., the knob 74 is pulled outward (to the left as viewed in Fig. 1) and thereby disengages 72 from the plate 65, after which the device may be swung back past the vertical line, as shown in the dotted lines in Fig. 1. This places the device completely out of the way and allows the operator to use the lathe in a normal manner without having anything in the way.

The device may be readily swung toward the operator and downwardly until the eccentric 72 engages the hole 67 in the plate 65, whereupon the lathe is instantly ready for dividing.

In the preferred embodiment of the invention as shown, the worm gear 13 has seventy-two teeth and the dial 51 has five major divisions, each advancing the travel of the spindle one degree. The major divisions of the dial are subdivided into ten parts, each corresponding to $\frac{1}{10}$ of a degree of the spindle. The vernier 55 further sub-divides the movement into 1/100 of a degree, thereby making it possible to divide a circle into 36,000 parts. The number of teeth on the gear may be greater than or less than seventy-two, but as much of the spacing is done by counting the revolutions of the dial 51, seventy-two teeth has been found preferable.

A modified form of a disc or wheel 47 is shown in Figs. 5, 6, and 7. This arrangement is provided for more accurately setting the disc or wheel 47 relative to the vernier 55 appearing on the member 53. By providing a double vernier, such as is shown in Fig. 7, it is possible to take care of thousandths of a degree, while the vernier shown in Fig. 1 only takes care of hundredths of a degree.

The vernier ring 53 has secured thereto an internal ring gear 78. The wheel 47 is tapped and provided with a bushing 79. The bushing 79 forms a bearing for a shaft 80. This bushing is also provided with a recess carrying a spring ring 81. The shaft 80 has one end thereof in the form of a pinion 82 having teeth of the same pitch as the teeth in the internal ring gear 78. The other end of the shaft 80 is provided with a knurled knob 83 by means of which the pinion 82 may be caused to engage the teeth in the ring gear 78. A rounded shoulder 84 is formed on the shaft 80 and adapted to cooperate with the spring ring 81. The spring, through the medium of the rounded shoulder, holds the shaft 80 with its pinion 82 engaging the ring gear when the knob 83 is positioned inwardly, and holds the shaft with the pinion 82 disengaged when the knob is pulled outwardly.

The knob 83 is usually left in its disengaged or outward position when the device is being operated to contain the rough or coarse adjustments, after which the knob 83 is pushed in with the pinion 82 engaging the ring gear 78, after which the knob 83 may be rotated in either direction and the fine adjustments may be accurately made by means of the double vernier, thereby making it possible to obtain an accuracy to within 1/1000 of a degree.

While a simple embodiment of the invention is herein shown and described, it is obvious that many modifications and changes may be made without departing from the spirit of the invention as defined in the appended claims.

What is claimed is:

1. In a dividing head adapted to be attached to a lathe, a worm gear adapted to be secured to the spindle of the lathe, a pivot shaft adapted to be supported on one side of the head stock of the lathe, a body member pivoted on said last shaft and adapted to be swung from a vertical to a horizontal position thereon, a worm shaft journaled in said member, a worm secured to said shaft, a hand wheel having a flat graduated circumferential face carried by said worm shaft and adapted to rotate the lathe spindle in either direction through the medium of the worm and the worm gear when said body member is swung to a horizontal position, a vernier ring resiliently supported on said member and having graduations on its face in cooperative relation with said first graduations, and means partly on said member and partly on said headstock for retaining said worm and said worm gear in operative relation while a dividing operation is being accomplished and for deeply meshing the teeth of said worm and worm gear after a desired setting of the hand wheel is obtained thereby locking the spindle against further movement, said means including a spring plunger which may be disengaged when the lathe is to be used without said attachment whereby said body may be swung upwardly more than ninety degrees.

2. A dividing head as claimed in claim 1 in which the body member is positioned immediately above the lathe spindle when a dividing operation is to be carried out and in which the body member may be swung backward and out of the way making all parts of the lathe accessible to an operator when regular lathe operations are to be carried on.

3. A dividing head as claimed in claim 1 in which the vernier ring is provided with an internal ring gear and in which the hand wheel is provided with a retractable shaft carrying a pinion whereby said pinion may be used to engage said ring gear for effecting fine adjustment of the hand wheel.

4. A device as claimed in claim 1, in which the body member is provided with a plurality of flutes and in which the vernier ring is also provided with a plurality of flutes held into engagement with said first flutes by resilient means, whereby the ring may be moved against the resilient means to disengage said flutes after which it may be rotated to bring a portion thereof into a position where illumination is best.

5. A dividing head as claimed in claim 1 in which the vernier ring is provided with an internal ring gear and in which the hand wheel is provided with a retractable shaft carrying a pinion whereby said pinion may be used to engage said ring gear for effecting fine adjustment of the hand wheel, said hand wheel having graduations on the rim thereof and said vernier having a vernier scale graduated thereon for effecting ordinary adjustments and at least one division of said vernier scale being further subdivided to facilitate the making of fine adjustments.

6. A dividing head as claimed in claim 1 in which the vernier ring is provided with a retractable shaft carrying a pinion whereby said pinion may be used to engage said ring gear for affecting fine adjustments of the hand wheel, said hand wheel having graduations on the rim thereof and said vernier ring having a first and a second vernier scale thereon, the graduations of said second scale being in predetermined fractional ratio to the graduations of said first scale.

7. A dividing head as claimed in claim 1 in which the vernier ring is rotatably mounted on the body member, the body member being provided with a retractable dowel adapted to engage any one of a series of depressions in said vernier ring, whereby said ring may be adjusted to a position most clearly visible to the operator, and in which means is provided to hold said vernier ring in close engagement with said handwheel.

8. A dividing head according to claim 1, in which the vernier ring may be adjusted to the scale on the hand wheel in any desired position and in which spring means is provided to retain the vernier ring in close proximity with said hand wheel.

9. In a device of the character described a pivot shaft positioned on one side of the headstock of a lathe, a worm gear mounted on the spindle of the lathe, a locating plate secured to said headstock and positioned thereon opposite said pivot shaft, a body member supported by said pivot shaft and adapted to be swung from a vertical to a horizontal position, a worm shaft journaled in said member, a worm secured to said shaft, a plunger pin carried by said member and adapted to engage said locating plate for retaining said worm in operative relation with said gear, a vernier ring rotatively adjustable on said member, and a hand wheel secured to said shaft in contact with said vernier ring with the circumferential faces of the vernier ring and the wheel substantially parallel to each other whereby graduations on the face of the wheel may be read relative to the graduations on the face of the vernier, said plunger pin being provided with a cam which engages said locating plate when the body member is swung to a horizontal position thereby retaining the worm in operative relation with the worm gear during a dividing operation, said cam being adapted to be rotated to tightly mesh and to lock the worm and worm gear together against rotation or back lash after a desired setting has been obtained.

10. In a device of the character described a pivot shaft positioned on one side of the headstock of a lathe, a worm gear mounted on the spindle of the lathe, a locating plate secured to said headstock and positioned thereon opposite said pivot shaft, a body member supported by said pivot shaft and adapted to be swung from a vertical to a horizontal position, a worm shaft journaled in said member, a worm secured to said shaft, a plunger pin carried by said member and adapted to engage said locating plate for retaining said worm in operative relation with said gear, a vernier ring rotatively adjustable on said member, and a hand wheel secured to said shaft in contact with said vernier ring with the circumferential faces of the vernier ring and the wheel substantially parallel to each other whereby graduations on the face of the wheel may be read relative to the graduations on the face of the vernier, said body member being provided with a dowel pin which may engage any one of a plurality of dowel holes formed in said adjustable vernier ring whereby the latter may be set in a position most visible to an operator, and means for holding said vernier ring into close engagement with said hand wheel.

LEO HOLTSCHNEIDER.